United States Patent Office 3,050,468
Patented Aug. 21, 1962

3,050,468
PREVENTION OF RUN-OFF IN BITUMINOUS EMULSIONS
James R. Wright, El Cerrito, Calif., assignor to California Research Corporation, San Francisco, Calif., a corporation of Delaware
No Drawing. Filed May 13, 1959, Ser. No. 812,813
8 Claims. (Cl. 252—311.5)

The present invention relates to an improvement in the production of oil-in-water type bituminous emulsions. More particularly, it relates to an improvement in the production of oil-in-water type bituminous emulsions known under the name of cationic emulsions and suitable for use in a variety of road-surfacing or paving applications. Furthermore, more specifically, it relates to an improvement in the production of said cationic bituminous emulsions, which reduces significantly the tendency of these emulsions towards run-off when these emulsions are applied to the aggregate, a tendency which causes a loss of the binder, an unsightly appearance and a weak texture of the road bed.

Before proceeding with the description of the invention, certain terms need to be defined:

A cationic oil-in-water type emulsion is one wherein dispersion (emulsification) of the oil particles in water is effected with the aid of a cationic emulsifier having at least one large hydrophobic group attached to the cation-active portion of its molecule. By corollary, a cationic oil-in-water type bituminous emulsion is one wherein particles of bitumen are dispersed in water with the aid of such cationic emulsifiers, e.g., an amine salt or a quaternary ammonium salt having a large hydrophobic group, such as a long-chain alkyl group, attached to the nitrogen atom.

A quaternary ammonium salt suitable as an emulsifying agent for the preparation of oil-in-water type cationic bituminous emulsions is one having the general formula

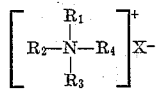

wherein $R_1$, $R_2$, $R_3$ and $R_4$ are organic radicals, $R'$ being a long alkyl chain of at least 12 carbon atoms and the total number of carbon atoms in $R_1$, $R_2$, $R_3$ and $R_4$ being sufficient to impart oil-solubility and emulsifying properties, and X is an anion, preferably a halogen, such as chlorine or bromine.

The application of cationic emulsifiers, such as the aforesaid quaternary ammonium salts, for the preparation of oil-in-water type bituminous emulsions, e.g., emulsions of asphaltic bitumen, commonly called asphalt emulsions, is relatively new in the art. At the same time, the cationic asphalt emulsions prepared in this manner offer a number of advantages when applied for road-surfacing work, either as mixes with coarse aggregates, for repair and resurfacing of roads, or as such, for seal-coat treatments of existing or new road surfaces. The use of these emulsions permits employment of electronegative aggregates, such as siliceous gravels and sandstones; furthermore, they are less likely to be damaged by rainfall and will cure relatively fast at low temperatures.

Despite these desirable advantages of cationic emulsions, a certain drawback has been encountered in their applications for road-surfacing, particularly in mixes with coarse aggregates, such as are presently handled with the aid of motorized paving equipment, e.g., by so-called "Moto-Pavers" described in Bulletin MP–49, published by Hetherington and Berner, Inc., of Indianapolis, Indiana. This drawback is a tendency of the emulsion to run-off, i.e., to drain from the aggregate at the site of the construction. The phenomenon of run-off is found to occur more or less independently of the quantity of asphalt residue in the emulsion and of the initial viscosity thereof. The consequences of run-off are: unsightly pools and streams of drained asphalt on the sides of the road bed; inadequate thickness of the film of bituminous binder (asphalt) remaining on the aggregate; and, at the same time, a lower adhesion of the film to the stone surface, and a lower wearing strength or wear-resistance of this film. Above all, however, the wastage of the bituminous binder to the extent of 20 to 40 and more percent, by weight of the original content thereof in the emulsion, represents a serious economic loss to the users of these emulsions.

I have now discovered an effective method for the substantial reduction of the aforementioned tendency of cationic bituminous emulsions to run-off, when employed for road-surfacing treatments, whether in mixes with coarse aggregates or as seal-coat emulsions.

This method consists in preparing the cationic emulsion of asphaltic bitumen or the like, introducing into this emulsion a comparatively small quantity of a quaternary nitrogen compound, and thoroughly distributing this quaternary compound throughout the emulsion. The quaternary nitrogen compounds effective in reducing the emulsion run-off are halide salts of quaternary nitrogen bases in which all four valences on the nitrogen atom are occupied by alkyl groups (as in quaternary ammonium halides) or are joined to carbon atom in a cyclic configuration (as in quaternary salts of alkyl pyridinium halides, alkyl quinolinium halides, or in 1,2-substituted imidazolinium halides). Preferably, the quaternary nitrogen-containing salts added to cationic emulsions and effective in preventing the run-off of the bituminous binder from the aggregate, are chlorides and bromides. At least one alkyl chain sufficiently long to impart lipophilic properties must be present in these quaternary nitrogen-containing salts, attached to the nitrogen atom either directly, e.g., cetyl trimethyl ammonium bromide; or through an intermediate linkage, such as an ether linkage, e.g., octyl phenoxyethoxyethyldimethylbenzyl ammonium chloride; an ester linkage, e.g., stearic acid ester of dibutylaminoethanol; a phenyl linkage, e.g., N-dodecylbenzyl-N, N-diethylethanol ammonium chloride; or an amide linkage, e.g., the reaction product of monoethanolamide of lauric acid and pyridine hydrobromide. In all events, this long-chain alkyl group should contain from 8 to 24 carbon atoms, and preferably from 12 to 22 carbon atoms.

The operative amounts of the quaternary nitrogen halide salt additive may vary from as little as 0.1 to about 1.0% by weight of the entire emulsion. Higher amounts may be employed, but for most practical purposes, addition of quaternary nitrogen halide salts in amounts ranging from about 0.2 to about 0.5% by weight of the emulsion is preferred. The actual amounts employed to achieve the optimum reduction of the emulsion run-off will vary somewhat, depending on the particular quaternary salt being added to the emulsion. In all events, this amount will lie in the range from 0.1 to about 1.0% by weight as mentioned hereinabove.

Generally, and in order to assure the optimum utilization of the emulsion with the least tendency towards run-off, the quaternary nitrogen halide salt additives are introduced into the cationic emulsion immediately upon its formation or they may be added subsequently to the "preformed" emulsion. In actual practice, when the minimum operative amount of an emulsifier is employed in order to reduce costs, the addition of the quaternary nitrogen halide is carried out at least two hours, and preferably four hours, after the emulsification. However, under different circumstances, shorter or longer periods can be satisfactory.

Any bituminous material capable of emulsification with the aid of cationic emulsifiers may be employed to prepare the emulsions, for instance, natural and petroleum asphalts, air-blown petroleum asphalts, gilsonite, coal tar, oil-gas tar, pitch, etc.

The cationic bituminous emulsions which can be improved in accordance with the invention, and which are intended for use in mixes with coarse aggregates or as such in seal-coat treatments of existing or newly laid road surfaces, usually will contain from about 55 to about 70% of dispersed bituminous material, such as petroleum asphalt or the like, based on the weight of the finished emulsion, although the quantity of the dispersed bituminous material under some circumstances can be either higher or lower. In actual practice, when cationic asphalt emulsions are applied to the road surface as mixes with coarse aggregate, the content of bitumen is preferably from about 65 to about 70% by weight, while in employing the emulsions for seal-coat treatments this content preferably ranges from about 55 to about 67%, based on the weight of the emulsion. The viscosity of these cationic emulsions may range from 100 to 500 seconds Saybolt-Furol (SSF) at 122° F., while their sieve test (on a 20-mesh screen) should not exceed 0.1%. Both the viscosity and the sieve test determinations are carried out in accordance with ASTM Testing Procedure D244–49 for Emulsified Asphalt, modified for use with cationic emulsions. The modification consists in washing the container employed for the sieve test with pure distilled water instead of the solution of sodium oleate.

The emulsification is effected in the manner conventional for cationic bituminous emulsions. Thus, for instance, in preparing asphalt emulsions which are to be improved eventually in accordance with the present invention, the cationic emulsifier (an amine salt, a quaternary ammonium salt, etc.) is first dissolved in water, preferably at a temperature of 100–125° F. Then the asphalt, heated at 240–280° F., is dispersed in the resulting aqueous solution in the colloid mill. Generally, from 50 to 70 parts of asphalt are thus emulsified with 50 to 30 parts of the water solution containing the cationic emulsifier. Thereupon the emulsified product can be immediately treated with the quaternary nitrogen halide salt additive in accordance with the invention; or, if necessary, it may be temporarily stored, pending the introduction of the quaternary nitrogen halide salt additive.

The cationic emulsifier may be any one of the nitrogen-containing cationic emulsifiers, for instance: a quaternary ammonium salt containing at least one high molecular weight hydrocarbon radical of eight or more carbon atoms, such as dimethylbenzyllauryl ammonium chloride; or an amine salt likewise containing at least one high molecular hydrocarbon radical of eight or more carbon atoms, e.g., octadecylamine hydrochloride; or mixtures of such emulsifiers. These materials are known in the art and have been described, for instance, in U.S. Patent No. 2,191,295, issued to Dohse and Spoun. Among commercially available emulsifiers the following are particularly suitable for the preparation of cationic emulsions of asphaltic bitumen: N-alkylbenzyl-N,N,N-trimethyl ammonium chloride, a product sold by Oronite Chemical Company under trademark "ATM–50"; N-alkylbenzyl-N,N-diethyl-N-ethanol ammonium chloride, also a product sold by Oronite Chemical Company under trademark "ADE–50." In both of these emulsifiers, the N-alkyl group is a branched-chain group containing an average of about 12 carbon atoms. Also suitable is N-alkyltrimethyl ammonium chloride (N-alkyl groups being mixed $C_{16}$–$C_{18}$ alkyl groups), a product sold by Armour Company, Armour Chemical Division, under the trademark "Arquad T."

The cationic emulsifiers are employed in amounts from about 0.2 to about 1.5% by weight, based on the finished emulsion, and preferably in amounts from about 0.25 to about 0.5% by weight. The actual amounts employed in each particular instance may vary depending on the cost of the particular emulsifier, its effectiveness for emulsification of bitumen, the amount of bitumen being dispersed, etc.

Once the emulsion has been formed, addition of quaternary nitrogen halide salts to prevent the run-off tendency may be effected in a straight-forward manner, and the desired proportion of the salt additive is thoroughly distributed in the emulsion, making sure that the salt dissolves completely in the aqueous phase and that the temperature does not exceed 150° F.

The effect of the addition on the reduction of the run-off tendency was positively demonstrated by the results of a stone-coating (water-resistance) test carried out on a representative coarse-aggregate mix, using the test equipment described for ASTM Coating Test D244–49.

In the test, 465 g. of wet graded highly siliceous Maryland aggregate (water content equal to 2%, based on dry aggregate) was added with a spatula to the round-bottom one-quart metal pan. The cationic emulsion had been prepared by emulsifying 65% by weight of 200–300 penetration grade Venezuelan asphalt having an average acid number of 1.0–1.25 in water which contained 0.75% by weight of N-cetylpyridinium chloride as the cationic emulsifier. In addition about 5% of a predominantly naphthenic petroleum thinner (boiling between 310–405° F.) was incorporated in the emulsion to soften the asphalt and thus to facilitate mixing with the aggregate. The amounts indicated are those in percent by weight of the final emulsion product. Thirty-five (35) grams of the prepared emulsion was then weighed into the aggregate in the pan and mixed vigorously therewith for two minutes. The percentage of the aggregate surface from which the emulsion stripped off at the end of these two minutes was then estimated visually, and the mixture set aside in the pan containing the spatula for 30 minutes at room temperature, placing one edge of the pan at 1-inch elevation to facilitate drainage. At the end of 30 minutes, without remixing and without removing the spatula, the emulsion run-off was carefully and completely drained from the mixture in the pan into a 3-ounce tin of known weight. The run-off was then weighed. The residue of the run-off was subsequently determined by using an electric hotplate to evaporate water and solvent and weighing the contents of the tin. The mixture which remained in the pan was drenched with cold tap water until the overflow ran clear. The excess water was drained off and the mixture dumped on absorbent paper. The percentage of the aggregate surface which remained coated with asphalt was evaluated visually. A good emulsion should not have a greater loss of asphalt by run-off than 10% by weight of the original asphalt content in the test sample of the emulsion.

The figures for the emulsion run-off and for the loss of asphalt by a representative cationic emulsion are given in the following Table I. In this table, in test runs 1 to 7, the emulsion was prepared with the aid of 0.75% by weight of N-cetyl pyridinium chloride emulsifier.

TABLE I
*Effect of Additives to Cationic Emulsions on Extent of Run-Off*

| Test Run No. | Quaternary nitrogen halide additive—Name | Emulsion run-off | | | Remarks |
| --- | --- | --- | --- | --- | --- |
| | | Amount in percent by weight of emulsion | Amount in grams | Loss in percent by weight of original asphalt content in emulsion | |
| 1 | None | | 14 | 35.0 | |
| 2 | Alkylbenzyldiethyl ethanolammonium chloride | 1.0 | 6 | 1.5 | Trade-marked material "ADE-50" supplied by Oronite Chemical Company. |
| 3 | ----do---- | 0.5 | 6 | 2.0 | Do. |
| 4 | ----do---- | 0.2 | 6 | 4.0 | Do. |
| 5 | 1-(2-hydroxyethyl)-2-heptadecenyl-1 (or 3)-(4-chlorobutyl)-2-imidazolinium chloride. | 0.2 | 6 | 3.0 | Trade-marked material "Nalquat G-9-12" supplied by National Aluminate Corp. |
| 6 | Alkylbenzyl trimethyl ammonium chloride | 0.2 | 6 | 5.0 | Trade-marked material "ATM-50" supplied by Oronite Chemical Company. |
| 7 | Behenyldimethylethanol ammonium bromide | 0.2 | 10 | 5.5 | |

It is apparent from the data in Table I that the addition of a quaternary nitrogen-containing halide salt to a cationic bituminous oil-in-water type emulsion results in an unexpected substantial reduction of the loss of the bituminous binder otherwise occasioned by the emulsion run-off. It is noted that the loss of the binder is brought down to a figure which is less than 10% by weight as compared with the quantity of the binder originally present in the emulsion (runs Nos. 2, 3, 4, 5, 6 and 7). Although the exact mechanism underlying this desirable effect of the quaternary nitrogen halide salt additive on the emulsion run-off is not fully understood, the fact remains that, in the absence of the additive (run No. 1), the loss of the bituminous binder exceeds from two to four times the maximum tolerable loss figure of 10%.

In another representative stone-coating test, carried out as described hereinbefore, the cationic emulsion was again prepared by emulsifying 65% by weight of the same Venezuelan asphalt in water (to make up 100% by weight) with the aid of 1% by weight of N-alkylbenzyl-N,N-diethyl-N-ethanol ammonium chloride as the emulsifier. As mentioned already, this material is supplied by Oronite Chemical Company under the trademark "ADE-50." The alkyl chain attached to the nitrogen atom through a phenyl ring, in this emulsifier, is a branched chain alkyl radical having an average number of 12 carbon atoms. In addition, the emulsion contained 0.02% by weight of ammonium chloride for the purpose of lowering the viscosity of the emulsion as well as 5% by weight of a predominantly naphthenic petroleum thinner (boiling between 310–405° F.) to soften the asphalt and to facilitate mixing with the aggregate. (This latter was a highly siliceous gravel of Maryland origin.)

Again the results in Table II unmistakably indicate the beneficial effect of the addition of a quaternary nitrogen-containing halide salt to cationic bituminous emulsions in accordance with the invention. While in the absence of such an addition the loss by run-off is inordinately high (run No. 1), when a small amount of such a salt in the range from 0.1 to about 1.0% by weight is added to the prepared emulsion, the loss is invariably reduced to a figure lower than 10% by weight, generally accepted as the maximum tolerable loss.

The reduction of the loss of the bituminous binder through emulsion run-off appears to be predicated on the application of halide salts containing quaternary nitrogen.

TABLE II
*Effect of Additives to Cationic Bituminous Emulsions on Extent of Run-Off*

| Test Run No. | Additive—Name | Emulsion run-off | | | Remarks |
| --- | --- | --- | --- | --- | --- |
| | | Amount in percent by weight of emulsion | Amount in grams | Loss in percent by weight of original asphalt content in emulsion | |
| 1 | None | | 3 | 13.2 | |
| 2 | Alkylbenzyldiethyl ethanol ammonium chloride | 1.0 | 6 | 5.8 | Trade-marked material "ADE-50" supplied by Oronite Chemical Company. |
| 3 | ----do---- | 0.1 | 7 | 8.0 | Do. |
| 4 | N-cetyl pyridinium chloride | 0.2 | 4 | 3.0 | |
| 5 | 1-(2-hydroxyethyl)-2 heptadecenyl-1 (or 3)-(4-chlorobutyl)-2-imidazolinium chloride. | 0.2 | 5 | 4.4 | Trade-marked material "Nalquat G-9-12" supplied by National Aluminate Corporation. |

When salts containing non-quaternary nitrogen are employed, e.g., amine salts, such as chlorides, bromides, and the like, the desired reduction is not achieved, and the loss cannot be reduced below the 10% figure. This specificity is illustrated by the results of the stone-coating test, carried out as described hereinabove, shown in next Table III. The emulsion employed in this test was prepared by emulsifying 62% by weight of the same Venezuelan asphalt in water (to make up 100%) with the aid of cetyl trimethyl ammonium bromide. About 5% by weight of a predominantly naphthenic petroleum thinner (boiling between 310–405° F.) was admixed to the finished emulsion to soften the asphalt and to facilitate mixing with the aggregate. (This was again the highly siliceous gravel from Prince George's County, Maryland.)

TABLE III

*Effect of Non-Quaternary Nitrogen-Containing Halides on Run-Off of Cationic Bituminous Emulsions*

| Test Run No. | Additive—Name | Emulsion run-off | | | Remarks |
|---|---|---|---|---|---|
| | | Amount in percent by weight of emulsion | Amount in grams | Loss in percent by weight of original asphalt content in emulsion | |
| 1 | None | | 17.4 | 43.8 | |
| 2 | C$_{16}$-C$_{18}$-primary alkyl amine hydrochloride | 0.2 | 17.4 | 39.0 | Hydrochloride of trade-marked material "Armeen HTD" supplied by Armour Chemical Division, Armour & Co. The alkyl portion derived from distilled hydrogenated tallow. |
| 3 | C$_{14}$-primary alkyl amine hydrochloride | 0.2 | 14.8 | 46.8 | Hydrochloride of trade-marked material "Armeen 14 D," also supplied by Armour Chemical Division. |

The results of Table III point out the ineffectiveness of halide salts containing nitrogen in a form other than that of quaternary nitrogen as additives to cationic bituminous emulsions for the purpose of reducing the loss of bituminous binder by emulsion run-off.

Quite often the cationic emulsifier employed to form an emulsion of bitumen (asphalt) in water is a quaternary nitrogen-containing halide salt, and the additive effective in reducing the run-off of the emulsion at the paving job's site is either the same or a different quaternary nitrogen-containing halide salt. However, the effectiveness of this halide in reducing the run-off and, by corollary, in reducing the loss of the bituminous binder hinges on the addition of the quaternary nitrogen-containing halide to an existing (preformed) emulsion. When this halide is added to the water intended for the emulsification of bitumen, either together with the emulsifier or (if the emulsifier and the additive are the same quaternary nitrogen halide) as an excess over the necessary quantity of emulsifier, adequate reduction of the run-off cannot be achieved. Once the emulsion has been formed, however, the addition of from about 0.1 to about 1.0% by weight of the quaternary nitrogen-containing halide to the emulsion results in the reduction of run-off and, correspondingly in the reduction of the bituminous binder to a figure below the tolerable maximum loss of the binder of 10%.

This is conclusively illustrated by the results of a comparative stone-coating test, shown in the following Table IV. For test No. 1 of this table, the emulsion was prepared by emulsifying 65% by weight of the same Venezuelan asphalt in water (to make 100% by weight), as in the tests illustrated in Tables I, II and III. The previously mentioned trademarked material "ADE-50" supplied by Oronite Chemical Company, was employed as the emulsifier in an amount equal to 1% by weight of the emulsion. For test No. 2, however, a similar emulsion (65% by weight of asphalt) was formed by using 0.8% by weight of the same N-alkylbenzyl-N,N-diethyl-N-ethanol ammonium chloride emulsifier ("ADE-50"). After the formation of the emulsion, 0.2% by weight of the same quaternary nitrogen halide ("ADE-50") was added to the emulsion. The stone-coating test was carried out in both runs as described hereinbefore, determining in each instance the loss of the asphalt binder due to run-off.

TABLE IV

*Effect of Addition of Quaternary Nitrogen Halide Salts— (1) to Water Before Emulsification and (2) to Emulsion After Emulsification*

| Test Run No. | Additive—Name | Emulsion run-off | | |
|---|---|---|---|---|
| | | Amount in percent by weight of emulsion | Amount in grams | Loss in percent by weight of original asphalt content in emulsion |
| 1 | | | 9.2 | 15.0 |
| 2 | N-alkylbenzyl-N,N-diethyl-N-ethanol ammonium chloride | 0.2 | 8.6 | 7.4 |

The results of Table IV indicate that when the quaternary nitrogen halide salt was added to the emulsion upon completion of the emulsification process, the loss of the bituminous binder by run-off was reduced by half as compared with the case of the emulsion, in which the additive was dissolved in water together with the emulsifier prior to the emulsification of bitumen.

The above illustrative data in Tables I, II, III and IV unmistakably indicate that the addition of quaternary nitrogen halide salts to cationic bituminous emulsions substantially reduces the run-off tendency of these emulsions, bringing the loss of the bituminous binder to a figure lower that 10% by weight, and, consequently, renders the cationic emulsions more desirable as road-surfacing materials by assuring substantial savings in the surface-treatment costs.

These data have been repeatedly and amply confirmed in the field upon actually applying the cationic emulsions prepared in accordance with the invention on many miles of new road construction and resurfacing jobs. In all instances, addition of quaternary nitrogen halide salts to the cationic emulsions, whether employed as such or in mixes with the aggregate, significantly reduced the emulsion run-off and, correspondingly, minimized the loss of the bituminous (asphalt) binder. Cationic emulsions of bituminous materials other than the asphaltic bitumen in the illustrative examples hereinabove, when suitable for use in surfacing treatments, whether in road work or in the industry or in the home, can be similarly improved by the described procedure of the invention and, consequently, are contemplated within the broader scope of the invention.

The foregoing description and examples are intended solely to illustrate the invention. Therefore, obvious variations thereof, apparent to those skilled in the art and coming within the scope of the appended claims, are likewise contemplated by the invention.

What is claimed is:

1. In the preparation of oil-in-water type cationic asphalt emulsions, an improved method which comprises emulsifying asphalt in water with the aid of a cationic emulsifying agent selected from the group consisting of amine salts and quaternary ammonium salts in an amount sufficient to effect formation of a stable oil-in-water type asphalt emulsion, characterized by an asphalt content of from about 55 to about 70% by weight based on the weight of the emulsion; introducing into this emulsion an amount equal to from about 0.1 to about 1.0% by weight of a quaternary nitrogen halide salt selected from the group consisting of bromides and chlorides; and thoroughly distributing this salt in the emulsion to dissolve it completely in the emulsion maintained at a temperature not exceeding about 150° F.

2. The method as defined in claim 1, wherein the quaternary nitrogen halide salt is added to the emulsion in the amount from about 0.2 to about 0.5% by weight.

3. The method as defined in claim 1, wherein said quaternary nitrogen halide salt added to the emulsion is a quaternary ammonium halide salt with at least one $C_8$–$C_{24}$ alkyl chain joined to the quaternary nitrogen atom.

4. The method as defined in claim 1, wherein said quaternary nitrogen halide salt added to the emulsion is an alkylbenzyl-diethylethanol ammonium chloride wherein the alkyl group contains from 8 to 24 carbon atoms.

5. The method of preventing emulsion run-off in the application of oil-in-water type cationic bituminous emulsions in paving work, which consists in adding from about 0.1 to about 1.0% by weight of a quaternary nitrogen halide salt selected from the group consisting of bromides and chlorides to an emulsion formed by emulsifying from about 55 to about 70% by weight of asphalt in water with the aid of a cationic emulsifier selected from the group consisting of amine salts and quaternary ammonium salts, said added quaternary nitrogen halide salt dissolving completely in the emulsion maintained at a temperature not exceeding about 150° F.

6. The method as defined in claim 5, wherein said quaternary nitrogen halide salt is added to the emulsion in an amount from about 0.2 to about 0.5% by weight.

7. The method as defined in claim 5, wherein said quaternary nitrogen halide salt added to the emulsion is an alkylbenzyldiethylethanol ammonium chloride wherein the alkyl group contains from 8 to 24 carbon atoms.

8. The method as defined in claim 5, wherein said quaternary nitrogen halide salt added to the emulsion is a quaternary ammonium halide salt with at least one $C_8$–$C_{24}$ alkyl chain joined to the quaternary nitrogen atom.

References Cited in the file of this patent

UNITED STATES PATENTS

| | | |
|---|---|---|
| 2,378,235 | Miles | June 12, 1945 |
| 2,706,688 | Sommer et al. | Apr. 19, 1955 |
| 2,722,515 | Reamer | Nov. 1, 1955 |

FOREIGN PATENTS

| | | |
|---|---|---|
| 775,917 | Great Britain | May 29, 1957 |